Patented Aug. 31, 1954

2,688,006

UNITED STATES PATENT OFFICE 2,688,006

COMPOSITION AND PROCESS FOR IMPROVING THE ADHESION OF RESINS TO GLASS FIBERS UTILIZING HYDROLYZED VINYL ALKOXY SILANE

Robert Steinman, Los Angeles, Calif., assignor to Libbey-Owens-Ford Glass Company, Toledo, Ohio, a corporation of Ohio No Drawing. Application January 7, 1952,
Serial No. 265,363

9 Claims. (Cl. 260—29.6)

This invention relates to the treatment of glass fibers and glass fiber products to improve the adhesion thereto of polyester resins.

One object of the invention is to provide a surface treatment for glass fibers which improves the adhesion thereto of synthetic resins. Another object is to provide a surface treating agent which improves the adhesion of plastic resin materials to glass fibers and which resists the loss of adhesion under high humidity conditions or immersion in water. Another object is to increase the strength of fiber-reinforced plastic resin bodies. A further object is to provide a treatment at the time of production of the glass fibers which results in improved adhesion of plastic materials to the fibers. Another object is to provide a sizing for glass fibers which does not inhibit the curing of the resin in which the fibers are later incorporated. A still further object is to provide an after-treatment for fibrous glass products which have initially been lubricated with other lubricating agents at the time of production, and necessary in the fabrication of glass yarns and the weaving of cloth and which is subsequently removed by chemical means or by heat. A further object is to provide sized glass fibers having improved adhesion to plastics, and greater resistance to moisture.

These and other objects of my invention are attained by following the process and preparing the treating agents as will now be described. I have discovered that a temporarily stable true water solution of an alkenyl silicone ester may be prepared, and also that glass fibers and glass fiber products when treated with suitable water dilutions of said solutions and dried, provide on said glass fibers a film or surface treatment which results in greatly improved adhesion of unsaturated addition type polymerizable resinous materials in which the fibrous glass products are incorporated as reinforcing agents, and greatly improved resistance of such products to lowering of strength under high humidity conditions or immersion in water.

I prefer to use vinyl triethoxysilane for the treatment of glass fibers and fibrous glass products in accordance with my invention. The vinyl group, because of its active nature, has been found to be particularly effective in improving the adhesion of resins or plastics to the surface of the glass fibers. The use of the temporarily stable water solutions of my invention provides a simple and effective treating process for glass fibers. The aqueous solutions of other alkenyl silicone esters such as α-chloro vinyl triethoxy silane and β-chloro vinyl triethoxy silane have also been found to result in improved adhesion and water resistance.

The water solutions are prepared by dissolving or hydrolyzing the silane at concentrations up to thirty parts by weight of the silane in one hundred parts by weight of water to which an acidifying agent which results in a pH from 3 to 4 has been added. The initially immiscible mixture of silane and water is vigorously stirred until a clear homogeneous solution is obtained, this requiring from thirty minutes to as long as six hours.

While more dilute solutions can be initially prepared, I prefer to use from ten to twenty parts by weight of the silane in one hundred parts by weight of water. The clear solution, after it is once produced as described, may be diluted as desired for particular uses. When the solution is made initially with lower concentrations of silane, the beneficial results on the glass fibers are attained but are not so pronounced, and when higher concentrations of silane solutions are initially formed, there is a decrease in the time during which they remain stable and usable.

The dissolving or hydrolysis of the silane in water is best brought about under conditions resulting in a pH of 3 to 3.5, usually by the addition of formic or other suitable acid. The higher the pH value the longer it takes to dissolve or hydrolyze the silane to a clear homogeneous solution, and also the lower the stability. At pH values lower than 3, that is at a pH of 2 or 1, the hydrolysis proceeds at a rate comparable with the rate of hydrolysis at the pH of 3 to 3.5, but the aqueous solutions are of decreased stability. The more dilute treating solutions (after diluting the initial solutions with water) are preferably kept between a pH of 3 to 4.

At a pH of 3.5, a concentrated solution remains stable (no precipitation) for 3 or 4 days and a dilute solution has stability from seven to ten days or longer. Comparatively, a concentrated solution at pH 5 is stable for about twenty-four hours, and a diluted solution is stable for about forty-eight hours. At pH 7, both concentrated and diluted solutions precipitate almost instantly.

Examples of the preparation of typical solutions are as follows:

1. Vinyl triethoxy silane was added to water in the preparation of one part by weight silane to nine parts by weight of water, the pH being adjusted to 3 to 3.1 by addition of formic acid. The mixture was then stirred vigorously and homogeneous clear solution was obtained in about thirty minutes. As prepared, this solution remained clear and stable for three days. A portion of this solution was diluted with water to about 1.25 percent silane, and this remained stable for seven days.

2. A commercial batch (different from Example 1) of vinyl triethoxy silane was used in preparing the following series of solutions, the liquids being adjusted to the indicated pH by means of formic acid and vigorously stirred to produce clear homogeneous solutions in the times indicated.

| Concentration of vinyl triethoxy silane | pH | Time of Hydrolysis | Stability | |
|---|---|---|---|---|
| | | | Original Solution | 1% Solution |
| 30% | 3.5 | 15 hours | 20 hours | 3 days. |
| 20% | 3.4 | Greater than 11 hrs | 24-28 hours | 4 days. |
| 10% | 3.2 | 180 minutes | 36 hours | 7 days. |
| 5% | 3.2 | 110 minutes | 40 hours | 8 days. |
| 2½% | 3.2 | 40 minutes | 48 hours | Greater than 14 days. |
| 1% | 3.1 | 20 minutes | | Greater than 14 days. |

3. Alpha chloro vinyl triethoxy silane was dissolved in water in the proportion of one part by weight of the silane to nine parts by weight of water, formic acid being added to give a pH 3, and the mixture being vigorously stirred for one hundred and forty minutes. This concentrated solution remained stable for twenty-four hours. The one percent solution prepared from this concentrated solution remained stable for forty-eight hours.

For application to fiber glass products which have been fabricated from fibers treated in the usual manner with lubricants such as starch, gelatine or the like, it is important to preclean the glass fiber or the fiber glass product, and this is best done by burning off the usual lubricating material, usually at a temperature of about 650° to 1100° Fahrenheit. The heat cleaned cloth, preform, or sliver is then dipped or sprayed with the dilute silane solution prepared in active form as described, and then dried and heat set at 225° to 375° F. for about three minutes. My solutions may, of course, be applied to glass fibers and glass fiber products which have not been previously sized, by spraying, wiping or dipping, and setting as above described.

In order to show the improvement in the adhesion of resinous glass fiber, I have prepared laminated panels using glass fiber cloth treated with my silane solutions as above described, bonded by several varieties of commercial synthetic resins of the addition polymerizable type known as low pressure resins or unsaturated polyester resins.

The laminates were made by saturating eleven layers of glass cloth with a resin that previously had been catalyzed with one percent benzoyl peroxide. After the air had been worked out from between the layers of glass cloth, the laminate assembly was placed in a cold press. The press was closed down against ⅛ inch thick spacers. This was done to maintain the resin content of the laminate in the range of 38 plus or minus 2 percent. The platens were then heated up to a temperature of 250° Fahrenheit in a period of fifteen to twenty minutes and held at that temperature for an additional thirty minutes. The laminated panel was then removed from the press and allowed to cool at room temperature. The laminate was cut into test strips and the physical properties measured. The following table gives a summary of the results obtained.

| Resin | Resin Content, % | Flexural Strength | | Cloth Finish (Pretreatment) |
|---|---|---|---|---|
| | | Dry | 30 days immersion in water | |
| A. (Laminac 4128) | 40 | 53,200 | 50,500 | vinyl triethoxy silane. |
| B. (Paraplex P-43) | 36.6 | 65,100 | 60,500 | vinyl triethoxy silane. |
| C. (Selectron 5104) | 38.6 | 68,300 | 56,800 | vinyl triethoxy silane. |
| D. (Vibrin 112) | 38.3 | 65,900 | 63,800 | vinyl triethoxy silane. |
| E. (Paraplex P-43) | 37.4 | 62,900 | 40,100 | 114. |
| F. (Selectron 5104) | 39.4 | 61,300 | 34,100 | 114. |

The test laminates E and F were prepared in the same manner as A to D, but the glass fiber cloth had been pre-treated with "finish 114," a methacrylate-chromic chloride complex material which is commonly supplied on glass cloth by many finishing companies. The comparison between the two groups indicates the advantage of treating with the water solutions or hydrolysates prepared as above described.

The flexural strengths were determined according to Federal Specifications L-P-406a, method No. 1031.

The advantages of improved adhesion and of improved resistance to deterioration of strength under high humidity conditions will be apparent from the data given. Other advantages are the white color of the fiber treating agent after curing which permits the making of colorless laminates; the lack of inhibition of resin cure due to any excess treating agent remaining of the fiber after treatment and the increase in electrical properties due to absence of metallic ions.

Loose glass fibers and glass fiber preforms for use with resins may also be treated or sized with the special solutions herein described with comparable improvement in the adhesion between the resin and the glass fibers, and similar resistance to water deterioration of the adhesion.

Where the expression "glass fibers" is used in this specification and the claims, it is intended to include single glass fibers, slivers, strands, yarn, mats, woven glass fiber cloth and any other forms of glass fiber.

The polyester resins referred to herein are commonly known as low pressure resins, unsaturated polyester resins, or thermosetting resins of the addition polymerization type. They are available commercially under the trade names as follows:

a. Selectron Resins manufactured by Pittsburgh Plate Glass Company.
b. Paraplex Resins manufactured by Resinous Products, Division, Rohm and Haas Company.
c. Vibrin Resins manufactured by Naugatuck Chemical Division, U. S. Rubber Company.
d. Laminac Resins manufactured by American Cyanamid Company.

Some of the specific resinous polymerizable chemical compounds that can be used are:

Diallyl phthalate and its copolymers
Diallyl phenyl phosphonate and its copolymers
Triallyl cyanurate and its copolymers
Diallyl cyanamide and its copolymers This application is a continuation-in-part of prior copending application, Serial No. 210,787, filed February 13, 1951, which application is now abandoned.

I claim:

1. A method for improving the receptivity of glass fiber surfaces for resinous materials which comprises the steps of contacting the glass fibers with an aqueous solution produced by homogenous aqueous hydrolysis at an acid pH of an alkoxy silane containing a radical selected from the group consisting of vinyl, α chloro vinyl and β chloro vinyl radicals attached to silicon and at least two alkoxy groups, the only radicals attached to silicon being one of the radicals of said group and alkoxy radicals and drying the said hydrolyzed silane on the glass fiber surfaces.

2. A method for improving the receptivity of glass fiber surfaces for resinous materials which comprises the steps of contacting the glass fibers with an aqueous solution produced by homogenous aqueous hydrolysis at an acid pH of a vinyl alkoxy silane containing at least 2 alkoxy groups, the only radicals attached to silicon being vinyl and alkoxy radicals, and drying the said hydrolyzed silane on the glass fiber surfaces.

3. A method for improving the receptivity of glass fiber surfaces for resinous materials which comprises the steps of contacting the glass fiber surfaces with an aqueous solution produced by homogenous aqueous hydrolysis at an acid pH of vinyl triethoxy silane, and drying the said hydrolyzed silane on the glass fiber surfaces.

4. A method for improving the receptivity of glass fiber surfaces for resinous materials which comprises the steps of contacting the glass fiber surfaces with an aqueous solution produced by homogenous aqueous hydrolysis at an acid pH of a vinyl trialkoxy silane, and drying the said hydrolyzed silane on the glass fiber surfaces.

5. A method for improving the receptivity of glass fiber surfaces for resinous materials which comprises the steps of contacting the glass fiber surfaces with an aqueous solution produced by homogenous aqueous hydrolysis at an acid pH of alpha-chloro-vinyl trialkoxy silane, and drying the said hydrolyzed silane on the glass fiber surfaces.

6. A method for improving the receptivity of glass fiber surfaces for resinous materials which comprises the steps of contacting the glass fiber surfaces with an aqueous solution produced by homogenous aqueous hydrolysis at an acid pH of beta-chloro-vinyl trialkoxy silane, and drying the said hydrolyzed silane on the glass fiber surfaces.

7. A composition of matter for application to glass fiber surfaces to improve the receptivity of said surfaces for resinous materials which consists essentially of a hydrolyzed aqueous solution produced by homogenous, aqueous hydrolysis at an acid pH of 1 to 30 parts by weight of a vinyl alkoxy silane containing at least two alkoxy groups, the only radicals attached to silicon being vinyl and alkoxy radicals, and 100 parts by weight of water.

8. A composition of matter for application to glass fiber surfaces to improve the receptivity of said surfaces for resinous materials which consists essentially of a hydrolyzed aqueous solution produced by homogenous, aqueous hydrolysis at an acid pH of 1–30 parts by weight of a vinyl trialkoxy silane, and 100 parts by weight of water.

9. A composition of matter for application to glass fiber surfaces to improve the receptivity of said surfaces for resinous materials which consists essentially of a hydrolyzed aqueous solution produced by homogenous aqueous hydrolysis at an acid pH of 1–30 parts by weight of vinyl triethoxy silane, and 100 parts by weight of water.

References Cited in the file of this patent

UNITED STATES PATENTS

| Number | Name | Date |
| --- | --- | --- |
| 2,392,805 | Biefeld | Jan. 15, 1946 |
| 2,436,304 | Johannson | Feb. 17, 1948 |
| 2,441,423 | Elliot et al. | May 11, 1948 |
| 2,486,162 | Hyde | Oct. 25, 1949 |
| 2,502,286 | Sowa | May 28, 1950 |
| 2,512,390 | Sommer | June 20, 1950 |
| 2,532,583 | Tyron | Dec. 5, 1950 |
| 2,537,073 | MacKenzie et al. | Jan. 9, 1951 |
| 2,563,288 | Steinman | Aug. 7, 1951 |
| 2,645,628 | Hurd | July 14, 1953 |

OTHER REFERENCES

Agre., Journ. Amer. Chem. Soc., vol. 71, 1949, pp. 300 to 304.